United States Patent
Guo et al.

(10) Patent No.: US 11,551,479 B2
(45) Date of Patent: Jan. 10, 2023

(54) MOTION BEHAVIOR PATTERN CLASSIFICATION METHOD, SYSTEM AND DEVICE

(71) Applicant: XIAMEN UNIVERSITY, Fujian (CN)

(72) Inventors: Shihui Guo, Fujian (CN); Juncong Lin, Fujian (CN); Minghong Liao, Fujian (CN); Chenxu Lu, Fujian (CN); Min Jiang, Fujian (CN); Xing Gao, Fujian (CN); Guilin Li, Fujian (CN); Xinyu Shi, Fujian (CN); Zeyong Hu, Fujian (CN)

(73) Assignee: XIAMEN UNIVERSITY, Fujian (CN)

(*) Notice: Subject to any disclaimer, the term of this patent is extended or adjusted under 35 U.S.C. 154(b) by 296 days.

(21) Appl. No.: 16/769,088

(22) PCT Filed: Oct. 30, 2019

(86) PCT No.: PCT/CN2019/114229
§ 371 (c)(1),
(2) Date: Jun. 2, 2020

(87) PCT Pub. No.: WO2020/088491
PCT Pub. Date: May 7, 2020

(65) Prior Publication Data
US 2020/0334451 A1    Oct. 22, 2020

(30) Foreign Application Priority Data
Nov. 1, 2018 (CN) .......................... 201811296819.1

(51) Int. Cl.
G06V 40/20    (2022.01)
G06K 9/62     (2022.01)
(Continued)

(52) U.S. Cl.
CPC .......... *G06V 40/20* (2022.01); *G06K 9/6256* (2013.01); *G06K 9/6267* (2013.01);
(Continued)

(58) Field of Classification Search
None
See application file for complete search history.

(56) References Cited

FOREIGN PATENT DOCUMENTS

| CN | 107092894 A | 8/2017 |
|---|---|---|
| CN | 107506712 A | 12/2017 |

(Continued)

OTHER PUBLICATIONS

Kulic et al.; Incremental Learning, Clustering and Hierarchy Formation of Whole Body Motion Patterns using Adaptive Hidden Markov Chains; Jul. 2008; International Journal of Robotics Research; pp. 761-784 (Year: 2008).*

(Continued)

*Primary Examiner* — Peter Hoang
(74) *Attorney, Agent, or Firm* — Muncy, Geissler, Olds & Lowe, P.C.

(57) ABSTRACT

A motion behavior pattern classification method, system and device relating to the human motion recognition field. The method includes: S1, determining a candidate motion behavior pattern which includes a motion behavior pattern to be classified; S2, acquiring time series of behavior data of the candidate motion behavior pattern through a motion control sensor; S3, establishing an LSTM motion behavior pattern classification model through the time series; S4, predicting the motion behavior pattern to be classified through the LSTM motion pattern classification model, comparing the prediction result obtained using the sequence within the T time with the prediction result obtained using the sequence within the T+Δt time using the iterative process to obtain the final prediction result, wherein $T_1 \leq T \leq T_2$, $T_1 > 0$, $T_2 > T_1$, and (Continued)

the incremental step is set to be Δt, Δt>0. The technical solution of the present invention may improve accuracy while reducing the latency of the motion behavior pattern classification.

9 Claims, 6 Drawing Sheets

(51) Int. Cl.
    *G06F 3/01*      (2006.01)
    *G06N 3/04*      (2006.01)
    *G06N 3/08*      (2006.01)
(52) U.S. Cl.
    CPC ............ *G06N 3/0445* (2013.01); *G06N 3/08* (2013.01); *G06F 3/011* (2013.01)

(56) References Cited

FOREIGN PATENT DOCUMENTS

| | | |
|---|---|---|
| CN | 107944409 A | 4/2018 |
| CN | 109447164 A | 3/2019 |
| WO | WO-2017150032 A1 | 9/2017 |

OTHER PUBLICATIONS

Switonski et al.; Dynamic time warping in classification and selection of motion capture data; Aug. 17, 2018; Multidimensional Systems and Signal Processing (2019) 30; pp. 1437-1468 (Year: 2018).*

* cited by examiner

MOTION BEHAVIOR PATTERN CLASSIFICATION METHOD, SYSTEM AND DEVICE

TECHNICAL FIELD

The present invention relates to the human motion recognition field, and in particular, to a motion behavior pattern classification method, system and device.

BACKGROUND ART

The application of sensor-based motion recognition in modern society is becoming more and more popular. Especially, the appearance of consumer-level devices for Virtual Reality (VR), such as Oculus, HTC Vive and the like, and the maturing technology lead to an increasing interest of the mass consumers on VR applications. The characteristic of immersive experience that brings by the VR application shows its extraordinary potential in the fields of education, broadcasting, entertainment etc. Enabling the experiencer to move freely in the virtual scene and ensuring the maximum degree of naturalness in the movement process is a critical functions of the VR applications, is also a major goal of researchers' ongoing efforts.

At present, motion modes mainly applied to VR environments for interaction mainly includes: in-place motion and motion based on an assistant device, such as a joystick, a handle or the like. Obviously, the natural motion mode completely identical with that in real world is the best motion mode capable of providing the best immersive experience, the highest intuition, and the greatest naturalness. However, it is always a challenging task to map the motion in real world to a standard motion capture system in the VR environment, such as Vicon, because it requires additional efforts in setting up external devices (specialized cameras and tracking suits etc.) will bring huge overhead in production, time and computing. Although alternative solutions, such as Kinect, can implement fast setup and accurate locating, users are physically constrained in a limited locomotion space and may not use such devices in outdoor environment due to the influence of the factors, such as light and noise etc.

Therefore, exploring a set of solutions that allow users to map their motion behaviors to virtual scenes in an intuitive and natural interactive manner in complex and changeable real scenes is significant for the long-term development of VR technology.

SUMMARY

In order to overcome the above problems, the present invention provides a motion behavior pattern classification method, system and device capable of capturing motion data of a person in a motion process through a motion control sensor to further capture behavior motion modes of the person in a real scene, mapping motion signals to specific behavior categories based on a large amount of users and different various behavior patterns, to thereby rapidly and accurately classify the motion behavior patterns of the person and further implement mapping the motion behaviors to the virtual scene in an intuitive and natural interaction manner in a complex and changeable real scene.

The specific technical solution adopted by the present invention is provided as follows:

On a first aspect, a motion behavior pattern classification method of the present invention includes:

S1, determining a candidate motion behavior pattern, the candidate motion behavior pattern including a motion behavior pattern to be classified;

S2, acquiring time series of behavior data of the candidate motion behavior pattern through a motion control sensor;

S3, establishing an LSTM motion behavior pattern classification model through the time series;

S4, based on the LSTM motion behavior pattern classification model, predicting the motion behavior pattern to be classified using an iterative process, the predicting specifically including following steps:

setting an initial value of a time variable T to be $T_1$, $T_1 \leq T \leq T_2$, $T_1 > 0$, $T_2 > T_1$, and setting an incremental step to be $\Delta t$, $\Delta t > 0$, wherein following steps s41 to s44 are performed during a process in which the T is increased:

s41, determining whether T is greater than $T_2$, proceeding to step s 44 if $T > T_2$, outputting a prediction result and proceeding to step s44 if $T = T_2$, and otherwise, proceeding to step s42;

s42, based on the LSTM motion behavior pattern classification model, performing prediction using the sequences of the behavior data of the motion behavior pattern to be classified within time duration of both T and T+$\Delta t$, respectively, and obtaining prediction results $Res_1$ and $Res_2$;

s43, comparing the prediction results Res1 and Res2, outputting the consistent result if they are consensus, and otherwise, recording a prediction result Res with the highest prediction probability currently, where T=T+$\Delta t$; and s44, ending.

Furthermore, the candidate motion behavior pattern in the S1 includes static standing, walking forward, walking backward, jumping, sliding left and right, and the S2 includes acquiring the time series of the behavior data of the candidate motion behavior pattern through pressure sensors in human insoles.

The number of the pressure sensors arranged in a single insole is 3, $T_1 = 0.1$ s, $T_2 = 1$ s and $\Delta t = 0.1$ s.

Furthermore, the S2 includes:

preprocessing the time series of the behavior data using a maximum and minimum value normalization method.

Furthermore, the S3 includes:

s31, labeling the motion behavior patterns corresponding to the time series for the time series;

s32, dividing the time series to be a training dataset and a prediction dataset according to a preset proportion; and s33, using data of the training dataset as training data, and establishing the LSTM motion behavior pattern classification model using a neural network optimizer based on an LSTM network.

Furthermore, the method further includes:

inputting data of the prediction dataset to the LSTM motion behavior pattern classification model for prediction to obtain the prediction result, comparing the prediction result with the motion behavior pattern corresponding to the prediction data, determining an accuracy of the prediction performed by the LSTM motion behavior pattern classification model.

Furthermore, the LSTM motion behavior pattern classification model uses a N*S matrix as an input, consists of three LSTM layers, of which each has 64 hidden units, uses a fully-connected layer as an output finally, and uses an Adam Optimizer with a learning rate of 0.0025 and a batch size of 1500, wherein N denotes the number of sensors and S denotes a sequence size of signal data of each sensor.

On a second aspect, the present invention provides a motion behavior pattern classification system, characterized in including a motion control sensor and a computing device, the computing device including a memory and a processor, wherein the memory stores at least a segment of program executed by the processor to implement the method of the first aspect.

On a third aspect, the present invention provides a computer readable storage medium, characterized in that the storage medium storing at least a segment of program executed by a processor to implement the method of the first aspect.

The technical solution provided by the present invention produces the following advantageous effects:

the present invention, determining a candidate motion behavior pattern, the candidate motion behavior pattern including a motion behavior pattern to be classified; acquiring time series of behavior data of the candidate motion behavior pattern through a motion control sensor; establishing an LSTM motion behavior pattern classification model through the time series; based on the LSTM motion behavior pattern classification model, predicting the motion behavior pattern to be classified using an iterative process, the predicting specifically including following steps: setting an initial value of a time variable T to be $T_1$, $T_1 \leq T \leq T_2$, $T_1 > 0$, $T_2 > T_1$, and setting an incremental step to be $\Delta t$, $\Delta t > 0$, comparing the prediction result $Res_1$ obtained using the series within the T time with the prediction result $Res_2$ obtained using the series within the $T+\Delta t$ time using the iterative process, in the iterative process in which T is increased from $T_1$ to $T_2$, outputting the consistent prediction result if the conclusion of the comparison is that $Res_1$ and $Res_2$ reach the consensus, otherwise, T being increased until a maximum value of T is reached, and selecting the pattern with the highest probability in previous prediction results as a final prediction result. Thus, the technical solution of the present invention is capable of mapping motion signals to specific behavior categories based on a large amount of users and different various behavior patterns, and rapidly and accurately classifying the motion behavior patterns of the person without artificial feature extraction, to thereby avoid the generation of human bias factors and further implement mapping the motion behaviors to the virtual scene in an intuitive and natural interaction manner in a complex and changeable real scene.

BRIEF DESCRIPTION OF THE DRAWINGS

In order to explain the technical solutions of the embodiments of the present invention more clearly, the figures required to be used in the description of the embodiments will be introduced briefly below. Obviously, the following described figures are merely some of the embodiments of the present invention, and other figures may be obtained according to these figures by those ordinarily skilled in the art without exerting any creative effort.

DETAILED DESCRIPTION OF THE EMBODIMENTS

In order for the purpose, technical solution and advantages of the present disclosure to be clearer, the embodiment solutions of the present invention will be further described in details below in conjunction with the drawings.

Figure 1:
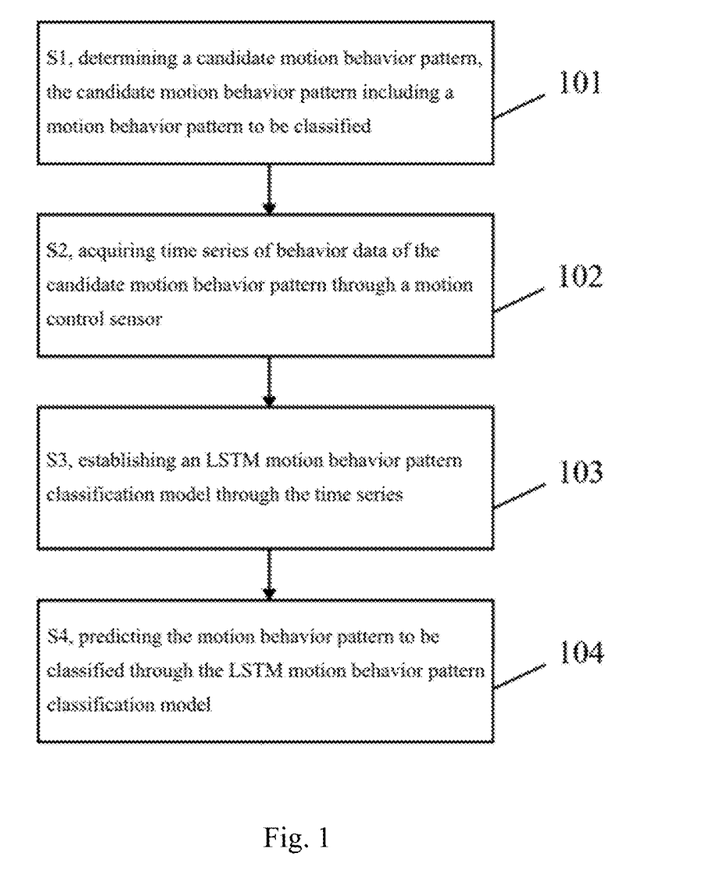
FIG. 1 shows a diagram illustrating a motion behavior pattern classification method according to the present invention.

FIG. 1 shows a diagram illustrating a motion behavior pattern classification method according to the present invention, and shows the specific implementation steps of the method, including:

in step 101, S1, determining a candidate motion behavior pattern, the candidate motion behavior pattern including a motion behavior pattern to be classified, wherein the candidate behavior pattern includes all of the possible motion behavior patterns and depends on the specific motion scene; in a possible implementation, in a VR scene, the motion behavior patterns of a person are very abundant, and preferably include static standing, walking forward, walking backward, jumping, sliding left and right; the candidate motion behavior pattern in the VR scene just includes the above six kinds at this moment, wherein the motion behavior pattern to be classified is included in the candidate motion behavior pattern;

in step 102, S2, acquiring time series of behavior data of the candidate motion behavior pattern through a motion control sensor, wherein in the step, the time series of the behavior data of a person in various candidate motion behavior patterns are collected through the motion control sensor, and different motion control sensors may be selected according to different motion scenes and different positions where the sensors are disposed and include components converting non-electricity (such as speed, pressure or the like) variations of the pressure sensors, the speed sensors and the like into electricity variations; in a possible implementation, inspired by the fact that people wear shoes to facilitate long-distance motion, we capture plantar pressure data during the motion process of a person by embedding the pressure sensors in the insoles to further capture the behavior motion modes of the person in a real scene; and the time series of the behavior data in various candidate motion behavior patterns of the person are collected through the pressure sensors in the human insoles to provide training data and test data to the classification model of the motion behavior pattern in the subsequent steps;

in step 103, S3, establishing an LSTM motion behavior pattern classification model through the time series, wherein a Long Short-Term Memory (LSTM) neural network is an improved structure of Recurrent Neural Network, resolves the problem of vanishing gradient occurring in the Recurrent Neural Network in some cases by adding structures, such as a forget get etc., and will produce the better classification effect for time series data of long sequence, thus, the LSTM network is adopted to establish the LSTM motion behavior pattern classification model in the technical solution of the present invention; in a possible implementation, it is established through the following steps:

s31, labeling the motion behavior patterns corresponding to the time series for the time series;

s32, dividing the time series to be a training dataset and a prediction dataset according to a preset proportion; and s33, using data of the training dataset as training data, and establishing the LSTM motion behavior pattern classification model using a neural network optimizer based on the LSTM network, wherein the above neural network optimizer includes standard gradient descent, stochastic gradient descent, mini-batch gradient descent, an Adaptive Moment Estimation (Adam) method etc., and an Adam optimizer may calculate an adaptive learning rate of each parameter; it should be explained that in the practical application, the Adam method has good effects, and has faster convergence rate and more effective learning than other adaptive learning rate algorithms, and may correct problems existing in other optimization technologies, such as a problem of gradient vanishing, slower convergence or larger fluctuations in a loss function due to parameter update of high variation;

furthermore, after establishing the LSTM motion behavior pattern classification model through the above steps s31 to s33, in order to further estimate prediction accuracies of the established model, in a possible practical implementation, inputting data of the prediction dataset to the LSTM motion behavior pattern classification model for prediction to obtain the prediction result, comparing the prediction result with the motion behavior pattern corresponding to the prediction data, determining an accuracy of the prediction performed by the LSTM motion behavior pattern classification model;

in step 104, S4, based on the LSTM motion behavior pattern classification model, predicting the motion behavior pattern to be classified using an iterative process, the predicting specifically including following steps:

setting an initial value of a time variable T to be $T_1$, $T_1 \leq T \leq T_2$, $T_1 > 0$, $T_2 > T_1$, and setting an incremental step to be $\Delta t$, $\Delta t > 0$, wherein following steps s41 to s44 are performed during a process in which the T is increased:

s41, determining whether T is greater than $T_2$, proceeding to step s 44 if $T > T_2$, outputting a prediction result and proceeding to step s44 if $T = T_2$, and otherwise, proceeding to step s42;

s42, based on the LSTM motion behavior pattern classification model, performing prediction using the sequences of the behavior data of the motion behavior pattern to be classified within time duration of both T and $T+\Delta t$, respectively, and obtaining prediction results $Res_1$ and $Res_2$, s43, comparing the prediction results Res1 and Res2, outputting the consistent result if they are consensus, and otherwise, recording a prediction result Res with the highest prediction probability currently, where $T = T + \Delta t$; and s44, ending.

It should be explained that calculation timecost of algorithms based on deep learning included in the prior art, such as Deep Neural Network (DNN) and the like, is far less than that of Dynamic Time Warping (DTW) algorithm, but they require the longer time series data as an input, otherwise, they cannot reach good accuracies, also causes serious latency, and cannot reach stable high accuracies for sparse input data.

In the present embodiment, the candidate motion behavior pattern is determined, the candidate motion behavior pattern including a motion behavior pattern to be classified; time series of behavior data of the candidate motion behavior pattern are acquired through a motion control sensor; an LSTM motion behavior pattern classification model is established through the time series; based on the LSTM motion behavior pattern classification model, the motion behavior pattern to be classified is predicted using an iterative process, the predicting specifically including following steps: setting an initial value of a time variable T to be $T_1$, $T_1 \leq T \leq T_2$, $T_1 > 0$, $T_2 > T_1$, and setting an incremental step to be $\Delta t$, $\Delta t > 0$, comparing the prediction result $Res_1$ obtained using the series within the T time with the prediction result $Res_2$ obtained using the series within the $T+\Delta t$ time using the iterative process, in the iterative process in which T is increased from $T_1$ to $T_2$, outputting the consistent prediction result if the conclusion of the comparison is that $Res_1$ and $Res_2$ reach the consensus, otherwise, T being increased until a maximum value of T is reached, and selecting the pattern with the highest probability in previous prediction results as a final prediction result. Thus, the technical solution of the present invention is capable of mapping motion signals to specific behavior categories based on a large amount of users and different various behavior patterns, and rapidly and accurately classifying the motion behavior patterns of the person without artificial feature extraction, to thereby avoid the generation of human bias factors and further implement mapping the motion behaviors to the virtual scene in an intuitive and natural interaction manner in a complex and changeable real scene.

The application of the motion behavior classification method mentioned by the present invention to the process of capturing and analyzing a real motion behavior pattern of a person through the motion behavior data collected through the pressure sensors in the insoles is described in the following embodiments in conjunction with the implementation steps 101 to 104 corresponding to FIG. 1, in order to further illustrate the contents of the present technical solution sufficiently, but is not limited hereto.

1) Determining candidate foot motion behavior patterns are determined, the present step exploring several representative foot motion behavior patterns that are frequently used by users in practical VR applications.

The research has been carried out with a group of 10 participants within an average age of 21.6, with standard deviation (SD) of 3.20. An average score for familiarity of Virtual Reality technology of the participants estimated by themselves is 3.28. Table 1 is a self-estimation table for a degree of familiarity of Virtual Reality technology.

TABLE 1

| Score | Standard |
|---|---|
| 1 | having not heard the concept of VR, not having any experience with VR applications, and not knowing any VR equipment |
| 2 | having heard VR, but not having firsthand experience with it |
| 3 | having firsthand experience with VR for less than but including 2 times |
| 4 | having firsthand experience with VR for more than 2 times |
| 5 | familiar with VR, or having participated in the research or development of VR projects, having rich experience with VR products |

Based on the experimental results of the above ten participants, two options for walking forward in a virtual world are provided: one is real walking, which preserves real motion experience to a maximum extent and is applicable to most situations with sufficient space; and a second option is in-place walking to implement the walking forward in a virtual world, and this mode is applicable to situations with limited space. We decide to adopt an in-place walking mode for running and jumping. On the contrary, we decides to adopt a real mode for sliding left, sling right and walking backward to provide the better user experience. Meanwhile, these three motions appear relatively less frequently than other motions, and this means they do not require much space.

2) Acquiring time series of behavior data through pressure sensors in insoles as training data The data collection has been carried out with a group of 32 volunteers within an age bracket of 19-30 years (average: 20.53, SD: 1.98). Each participant performed eight activities (static standing, walking forward, in-place walking, walking backward, running, jumping, sliding left and right) wearing the shoes in which smart insoles are embedded, that is to say, the candidate motion behavior pattern corresponding to the step 101 includes static standing, walking forward, in-place walking, walking backward, running, jumping, sliding left and right.

In a possible practical operation, the smart insole from Podoon Technology Ltd. is used to complete this research. Each insole has three pressure sensors and one onboard processing chip. The chip uses the technology of Bluetooth Low Energy, which only consumes low-cost energy to send pressure information via Bluetooth to other processing devices. Each sensor returns an integer value within the range of [0, 255] to indicate a magnitude of foot pressure. A sampling frequency of the pressure information is 50 Hz and a transmission frequency is 10 Hz.

A maximum and minimum value normalization method is used to preprocess the behavior data of each participant to neutralize the effect of body weights of different individuals on the results. Our method directly adopts the dataset containing noise as an input without denoise process in the following process, that is to say, our method performs well in terms of noise tolerance. Subsequently, the time series data is divided into different samples, and each sample is in a size of N*S, where N denotes the number of the sensors, and S denotes a sequence size of signal data of each sensor. Our method tests results of sequence sizes from 10 to 100. The entire dataset is randomly partitioned into two sets, where 90% of the samples were selected as the training dataset and 10% as the test dataset. For example, Table 2 and Table 3 are statistic information tables of the datasets.

TABLE 2

| Shoe Size | Number of Participants | Total Duration (Unit: min) |
|---|---|---|
| 6 | 10 | 269.8 |
| 7.5 | 10 | 292.3 |
| 8.5 | 12 | 358.1 |

TABLE 3

| Motion Behavior | Samples of Test Dataset | Samples of Training Dataset |
|---|---|---|
| Static Standing | 644 | 6012 |
| Walking Forward | 597 | 5274 |
| In-place Walking | 701 | 5953 |
| Walking Backward | 737 | 6524 |
| Jumping | 678 | 6012 |
| Running | 666 | 6211 |
| Sliding Left | 665 | 6085 |

TABLE 3-continued

| Motion Behavior | Samples of Test Dataset | Samples of Training Dataset |
|---|---|---|
| Sliding Right | 708 | 6452 |
| Total | 5396 | 48562 |

4) Using the LSTM neural network as a motion classifier, using a N*S matrix as an input, the network structure consisting of three LSTM layers, each layer having 64 hidden units, using a fully-connected layer as an output finally, and using an Adam Optimizer with a learning rate of 0.0025 and a batch size of 1500. Comparing with the conventional time series data classification method DTW, the technical solution of the present invention does not require artificial feature extraction and avoids human bias factors. In a possible practical operation, the training and testing of the LSTM network may be conducted on a server with Intel Core i7 (six cores), 16G memory and NVidia GTX 1080Ti. The server receives the sensor data, conducts the prediction and sends the results to a VR helmet. All data are transmitted based on TCP protocol.

Figure 2:
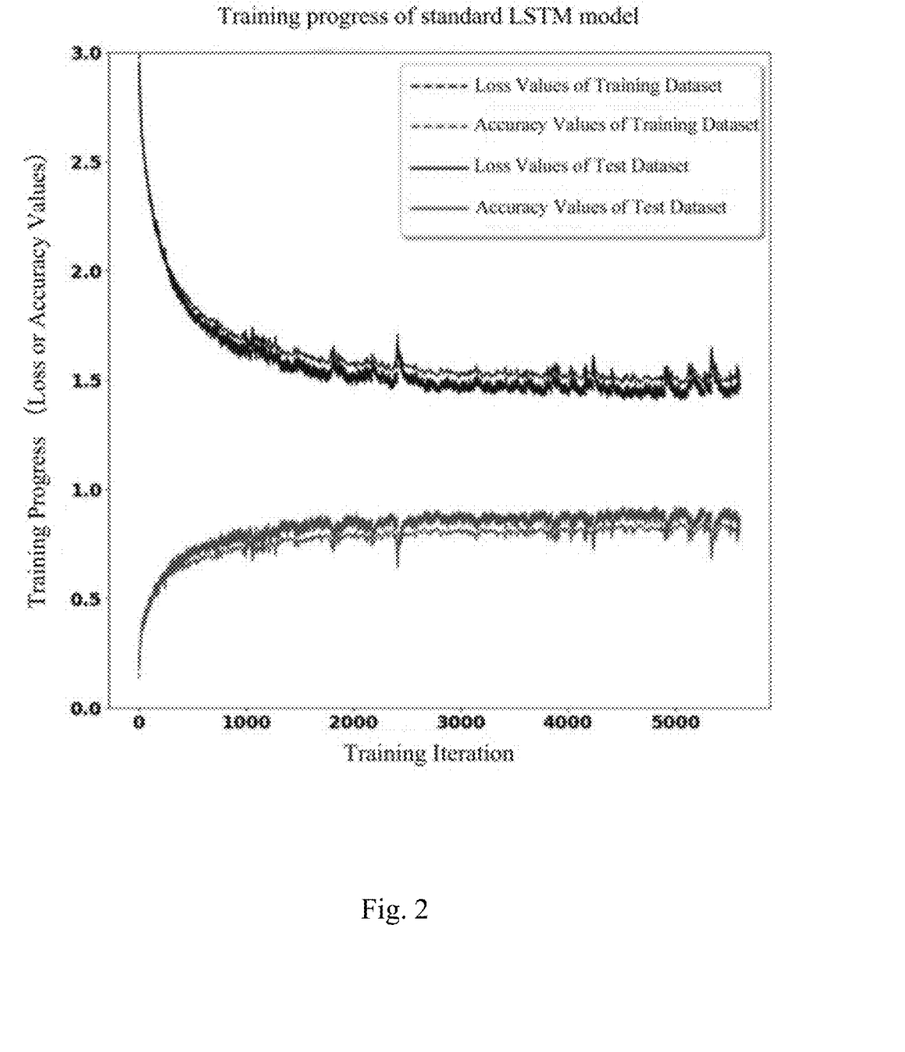
FIG. 2 shows a diagram illustrating variation cases of loss functions and accuracies of a training dataset and a test dataset in a LSTM model according to the present invention.

FIG. 2 shows variation cases of loss functions and accuracies of a training dataset and a test dataset in a LSTM model according to the present invention. This diagram is generated using the test dataset of shoe size 6 with the sample size of 100. The learning converges to an optimal solution after 1000 iterations, which costs around 20 minutes. The final accuracies reach around 0.85 for both two datasets. The result shows that the accuracy of the test dataset is close to that of the training dataset, which confirms that the problem of over-fitting is avoided.

Figure 3:
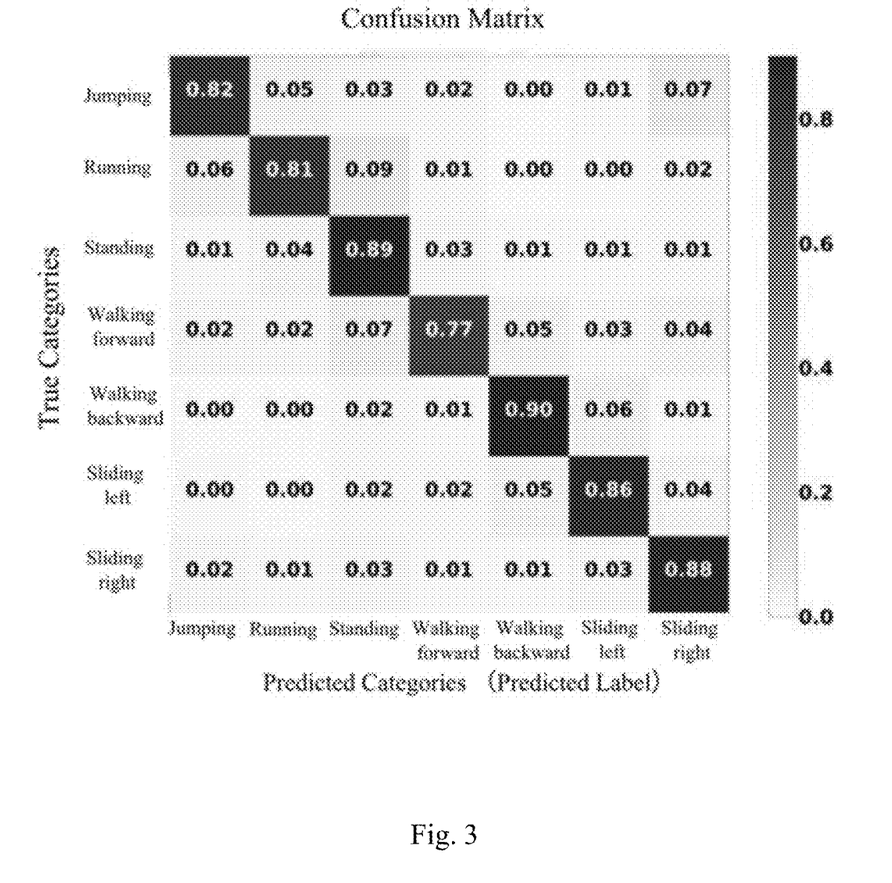
FIG. 3 shows a diagram illustrating a normalized confusion matrix of different motion patterns according to the present invention.

FIG. 3 shows a diagram illustrating a normalized confusion matrix of different motion patterns according to the present invention. This diagram is generated using the test dataset of shoe size 6 with the sample size of 100. The result shows that the action of walking forward is recognized as standing (7%) and walking backward (5%). This error is caused by the similarity of these foot patterns. The accuracy may be further improved with the method proposed by the present invention. Meanwhile, the patterns of standing, walking backward and sliding left/right are recognized with high accuracy of over 85%.

It should be explained that the accuracy of the standard LSTM neural network for the classification of input data of 2 seconds is around 80%, that is to say, the LSTM algorithm has serious latency, which means that the LSTM may test an action of jumping only after the action of jumping is finished. This latency will greatly affect the user experience. In order to resolve this problem, the technical solution of the present invention provides a Double-Check Till Consensus (DOCTIC) algorithm to carry out the faster and more accurate testing. The DOCTIC here just corresponds to the method of the step 104 in FIG. 1. In order to facilitate the explanation, the DOCTIC will represent the classification method of the motion behavior pattern proposed by the present invention in the following description.

The observation through the experiment is that the forward broadcasting process of the LSTM model is efficient (less than 1 millisecond). Based on such an observation, the method of the corresponding step 104 in FIG. 1 is utilized to use an iterative process to compare the prediction results obtained using the series within time duration of both T and T+δT. T increases from 0.1 second to 1 second. If the conclusions obtained from two comparisons reach the consensus, the final conclusion is obtained; otherwise, T is increased until the maximum value of T is reached. For the latter case, the prediction result with the highest probability in the previous predictions will be selected as the final conclusion. The result shows that for the DOCTIC algorithm, the latency is reduced to 0.5 seconds, the accuracy is improved to 97%, and fast and accurate recognition on motions is implemented.

Figure 4:
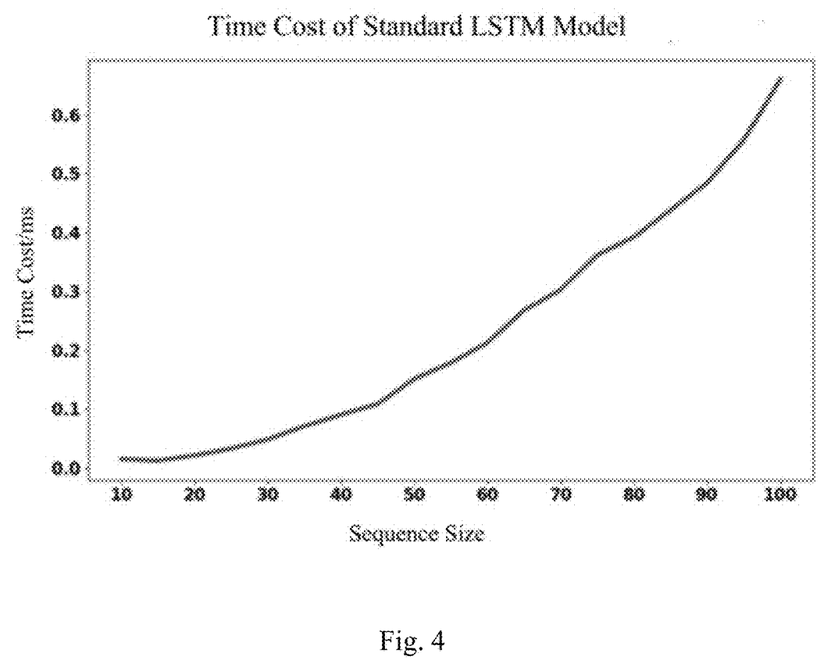
FIG. 4 shows a diagram illustrating time cost of a standard LSTM model considering different sample sizes according to the present invention.
Figure 5:
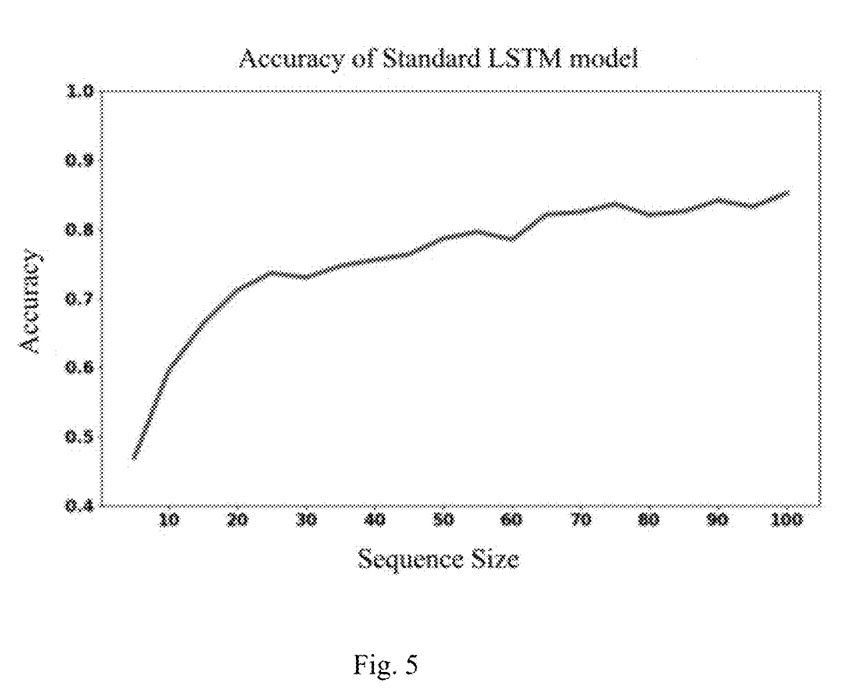
FIG. 5 shows a diagram illustrating accuracies of a standard LSTM model considering different sample sizes according to the present invention.

4) Explaining the technical effect of the technical solution of the present invention in terms of different aspects The performance of the standard LSTM is not the same for different sample sizes. The time cost increases from less than 0.1 to 0.6 millisecond when the sample size increases from 10 (0.2 seconds) to 100 (2 seconds). FIG. 4 shows a diagram illustrating time cost of the standard LSTM model considering different sample sizes according to the present invention. It should be explained that the time cost for processing the largest sample here is still negligible, in comparison with a time gap between two data transmissions (0.1 second). The accuracy rate improves significantly from 50% to over 80% as the sample size increases. FIG. 5 shows a diagram illustrating accuracies of the standard LSTM model considering different sample sizes according to the present invention.

This indicates a longer sequence of data signal allows the classifier to better understand gait modes and make correct recognition. However, it is worth noting that it requires the sample size to be over 75 (1.5 seconds) in order to reach an accuracy of 80%. The method DOCTIC proposed by the present invention improves the standard LSTM model by significantly shortening the time latency without decreasing the accuracy.

Figure 6:
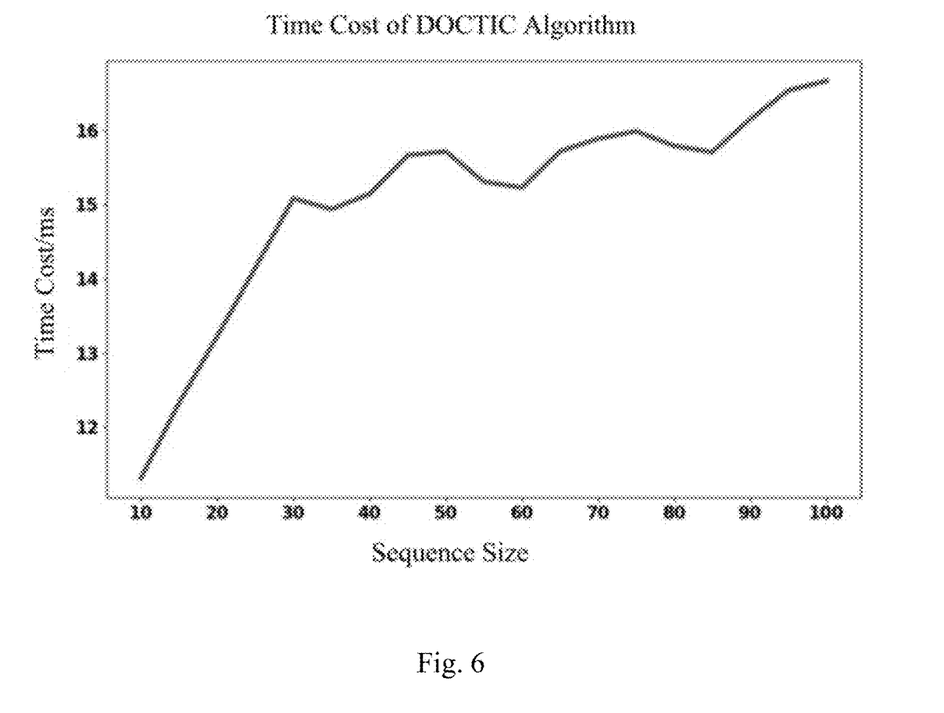
FIG. 6 shows a diagram illustrating time cost of DOCTIC considering different sample sizes according to the present invention.
Figure 7:
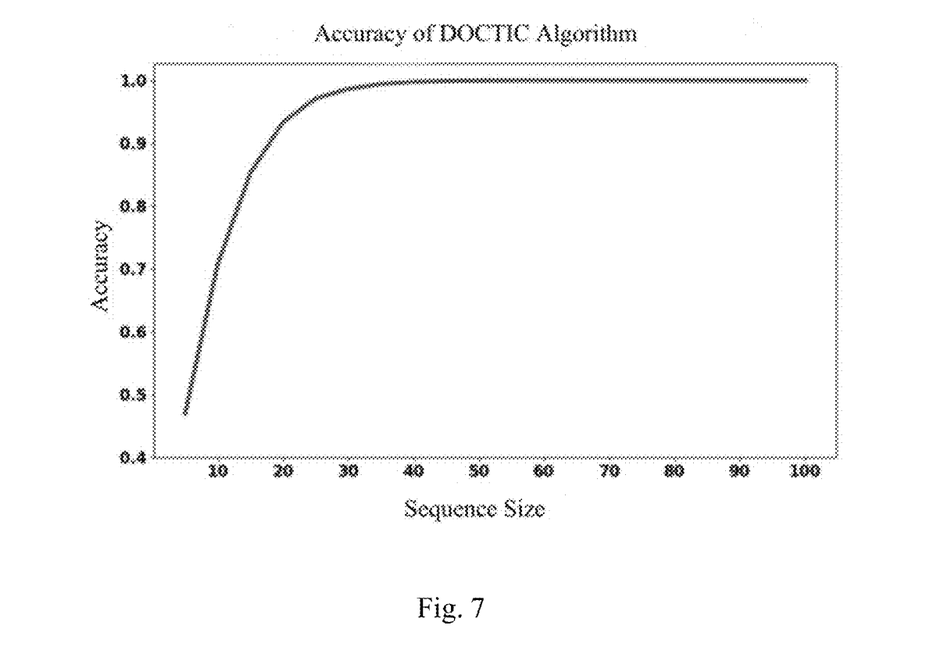
FIG. 7 shows a diagram illustrating accuracies of DOCTIC considering different sample sizes according to the present invention.

The performance of DOCTIC proposed by the technical solution of the present invention is not the same for different sample sizes. FIG. 6 shows a diagram illustrating time cost of DOCTIC considering different sample sizes according to the present invention. With the iterative process in DOCTIC, the time cost increases 10 times as the standard LSTM model. However, the maximal time cost is still 15 milliseconds, still far less than the time gap between two data transmissions. Meanwhile the accuracy improves significantly for smaller segments of samples. FIG. 7 shows a diagram illustrating accuracies of DOCTIC considering different sample sizes according to the present invention. Using a sample size of 15 (0.3 seconds) can achieve an accuracy of 85.3%, a comparable performance as the best accuracy in the standard LSTM model. In addition, the sample size of 25 could improve the accuracy further to 97.1%. This indicates that for most cases, the technical solution of the present invention can produce the consensus of the prediction results with the time cost, significantly shorter than the time cost of the maximum sequence size 100 (2 seconds).

Further, we train the classifier for different shoe sizes and compare the accuracy when training the complete dataset as a general classifier. The results show that training the individual classifier achieves better accuracy for all shoe sizes, over the general classifier. All users should be aware of their shoe sizes, which implies that it is an acceptable solution to ask the users to pick the correct shoe sizes when they use this application for the first time. A file size of the saved network is around 9 megabytes, which is sufficiently small so that multiple models can be saved on the hard disk even for an embedded system. Table 4 shows accuracies for training the individual classifier for different shoe sizes and a general classifier for all shoe sizes, wherein the sample size is 100.

TABLE 4

| Shoe Size (US) | Accuracy |
|---|---|
| 6 | 0.83 |
| 7.5 | 0.85 |
| 8.5 | 0.83 |
| Total | 0.78 |

The present invention further discloses the comparison situations of the technical solution of the present invention with Dynamic Time Warping (DTW) and K Nearest Neighbors (KNN). The combined recipe of DTW and KNN is a representative method in the domain of time series data classification. The collected data is first processed by computing a vector of [mean, medium, max, min, standard deviation], in the case where the selected time span is given. DTW aligns two vectors which are originally out of phase, then computes the corresponding distance between these sequences. A label of the test sequence is predicted by finding the closest neighbor (K=1) in the training dataset. Research shows that this method achieves satisfactory accuracy and is difficult to beat for the task of time series classification in real time. For real-time applications, the too large computing cost of this method causes consuming a lot of time. One solution is to reduce the size of the dataset. We accelerate the computation process by reducing the dataset. The results show that although the full-size dataset achieves the accuracy around 90%, each attempt to find the closest neighbor in the dataset costs >7 seconds. When reducing the dataset to speed up the computation, the accuracy drops significantly.

In comparison, the method of the present invention achieves the comparable accuracy against DTW&KNN when the dataset is maintained at 25% or above, however at the cost of 0.46 milliseconds as opposed to about 2 seconds by DTW&KNN. This shows that the classifier built by our LSTM model may recognize the motion pattern in the large dataset, and may successfully detect the motion pattern without the need to compare against the individual sample in the database. Table 5 shows comparison of the accuracy and time cost for methods of DTW&KNN and the method proposed by the present invention on the dataset of shoe size 8.5, wherein unit for the time cost is milliseconds and the sequence size is 100.

TABLE 5

| | Ratio of Complete Dataset | Accuracy | Timecost per Sequence |
|---|---|---|---|
| DTW | 100% | 0.87 | 7585.13 |
| DTW | 50 | 0.85 | 4021.45 |
| DTW | 25 | 0.82 | 1936.34 |
| DTW | 12.5 | 0.79 | 1013.11 |
| DTW | 5.0 | 0.75 | 390.00 |
| DTW | 1.0 | 0.57 | 77.55 |
| DTW | 0.5 | 0.44 | 44.39 |
| Present Method | N/A | 0.83 | 0.46 |

The technical solution of the present invention also invites volunteers to perform practical experiences in different virtual scenes to detect the performance of this method in practical application in terms of naturalness, accuracy, and fluency. Optionally, in the virtual laboratory scenario, by reconstructing a virtual laboratory that is completely consistent with the layout of the real laboratory, the participants roam in the virtual laboratory in real mode and record her/his vision in the virtual world and her/his location in the real world, respectively; optionally, in a virtual runway scene, there are prompts on the runway to require users to complete each motion in turn. For example, in the jumping phase, we set 8 obstacles to evaluate the accuracy of the detection algorithm in turn; optionally, for a zombie town game, a first-person shooting game, users can roam freely in virtual scenes, jump over obstacles and shoot zombies, etc., in the process, users will use a variety of motion forms: standing/walking forward/running/jumping/sliding left/sliding right etc., in order to traverse challenging environment (such as a cross-bar obstacle). The situations of the motion behavior classification applied to different virtual scenes all have good user feedback, which further indicates that the technical effects produced by the technical solution of the present invention represents notable progress. Table 6 is a result table for scoring a degree of naturalness, a degree of latency and an accuracy rate by the participants in the application of the motion behavior pattern classification method of the present invention.

TABLE 6

| Scoring Item | Standard Score (1 to 5) | Average Score | Standard Deviation |
|---|---|---|---|
| Degree of Naturalness | 1 represents extremely unnatural, 5 represents very natural | 3.50 | 0.53 |
| Degree of Latency | 1 represents high latency, 5 represents low latency | 3.38 | 0.52 |
| Accuracy Rate | 1 represents low accuracy rate, 5 represents high accuracy rate | 3.88 | 0.35 |

For the interaction manners with the use of insoles and the conventional handle, 90% of the users express that they prefer the insole interaction mode, which indicates that the technical solution of the present invention has a very broad application prospect in the practical applications.

Figure 8:
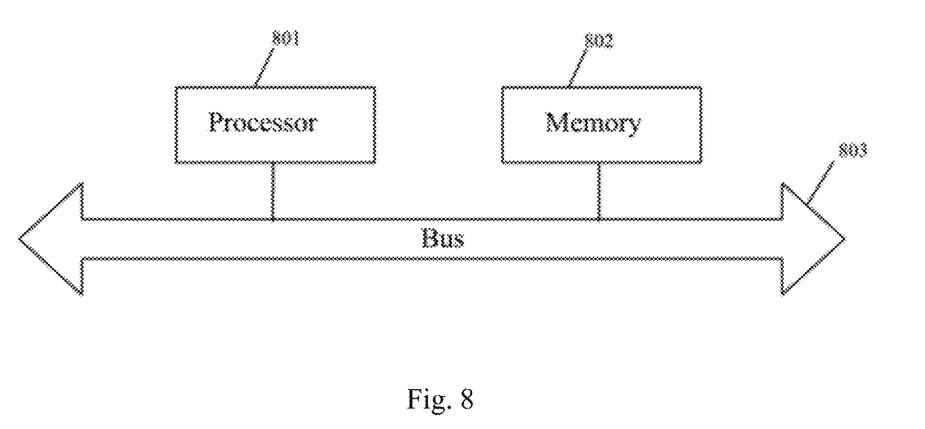
FIG. 8 shows a diagram illustrating a computer device in a motion behavior pattern classification system according to embodiments of the present invention.

The present invention further discloses a motion behavior pattern classification system, including a motion control sensor and a computing device. FIG. 8 shows a diagram illustrating a computer device in a motion behavior pattern classification system according to embodiments of the present invention. The device mainly includes a processor 801, a memory 802 and a bus 803. The memory stores at least a segment of program executed by the processor to implement the method of the above embodiment.

The processor 801 includes one or more processing cores, and is connected to the memory 802 via the bus 803. The memory 802 is used to store a program instruction, and the processor 801 implements the motion behavior pattern classification method provided by the above embodiment while executing the program instruction in the memory 802.

Optionally, the memory 802 may be implemented by any type of volatile or non-volatile storage device or a combination thereof, such as static random access memory (SRAM), electrically erasable programmable read-only memory (EEPROM), erasable programmable read-only memory (EPROM), programmable read-only memory (PROM), read-only memory (ROM), magnetic memory, flash memory, magnetic disk or optical disk.

The present invention further provides a computer readable storage medium, in which at least a piece of instruction, at least a segment of program, and a code set or an instruction set may be stored, and the at least a piece of instruction, the at least a segment of program, and the code set or instruction set are loaded and executed by the processor to implement the motion behavior pattern classification method provided by the above method embodiment.

Optionally, the present invention further provides a computer program product containing an instruction, and when it is running on the computer, the computer is enabled to execute the motion behavior pattern classification method described in the various aspects.

Those ordinarily skilled in the art may understand that all or partial steps for implementing the above embodiments may be implemented through hardware, or may be implemented by a program to instruct the related hardware. The program may be store in a computer readable storage medium. The above mentioned storage medium may be a read-only memory, magnetic disk or optical disk etc.

The above embodiments are only optimal embodiments of the present invention, and are not used to limit the invention. Any amendments, equivalent replacements and improvements made therein without departing from the spirit and scope of the present invention should be included in the protection scope of the present invention.

The invention claimed is:

1. A motion behavior pattern classification method stored in a computer readable storage medium and executed by a processor, comprising:
    S1, determining a candidate motion behavior pattern, the candidate motion behavior pattern comprising a motion behavior pattern to be classified;
    S2, acquiring time series of behavior data of the candidate motion behavior pattern through a motion control sensor;
    S3, establishing an LSTM motion behavior pattern classification model through the time series;
    S4, based on the LSTM motion behavior pattern classification model, predicting the motion behavior pattern to be classified using an iterative process, the predicting specifically comprising following steps:
        setting an initial value of a time variable T to be $T_1$, $T_1 \leq T \leq T_2$, $T_1 > 0$, $T_2 > T_1$, and setting an incremental step to be $\Delta t$, $\Delta t > 0$, wherein following steps s41 to s44 are performed during a process in which the T is increased:
        s41, determining whether T is greater than $T_2$, proceeding to step s44 if $T > T_2$, outputting a prediction result and proceeding to step s44 if $T = T_2$, and otherwise, proceeding to step s42;
        s42, based on the LSTM motion behavior pattern classification model, performing prediction using the sequences of the behavior data of the motion behavior pattern to be classified within time duration of both T and T+Δt, respectively, and obtaining prediction results $Res_1$ and $Res_2$,
        s43, comparing the prediction results $Res_1$ and $Res_2$, outputting the consistent result if they are consensus, and otherwise, recording a prediction result Res with the highest prediction probability currently, where $T = T + \Delta t$;
        s44, ending.

2. The method of claim 1, wherein the candidate motion behavior pattern in the S1 comprises static standing, walking forward, walking backward, jumping, sliding left and right.

3. The method of claim 1, wherein the S2 comprises: acquiring the time series of the behavior data of the candidate motion behavior pattern through pressure sensors in human insoles.

4. The method of claim 3, wherein a number of the pressure sensors arranged in a single insole is 3, $T_1 = 0.1$ s, $T_2 = 1$ s and $\Delta t = 0.1$ s.

5. The method of claim 1, wherein the S2 comprises:
preprocessing the time series of the behavior data using a maximum and minimum value normalization method.

6. The method of claim 1, wherein the S3 comprises:
s31, labeling the motion behavior patterns corresponding to the time series for the time series;
s32, dividing the time series to be a training dataset and a prediction dataset according to a preset proportion; and
s33, using data of the training dataset as training data, and establishing the LSTM motion behavior pattern classification model using a neural network optimizer based on an LSTM network.

7. The method of claim 6, further comprising:
inputting data of the prediction dataset to the LSTM motion behavior pattern classification model for prediction to obtain the prediction result, comparing the prediction result with the motion behavior pattern corresponding to the prediction data, determining an accuracy of the prediction performed by the LSTM motion behavior pattern classification model.

8. The method of claim 1, wherein the LSTM motion behavior pattern classification model uses a N*S matrix as an input, consists of three LSTM layers, of which each has 64 hidden units, uses a fully-connected layer as an output finally, and uses an Adam Optimizer with a learning rate of 0.0025 and a batch size of 1500, wherein N denotes the number of sensors and S denotes a sequence size of signal data of each sensor.

9. A motion behavior pattern classification system, comprising a motion control sensor and a computing device, the computing device comprising a memory and a processor, wherein the memory stores at least a segment of program executed by the processor to implement the method of claim 1.

* * * * *